United States Patent [19]

Haussling

[11] Patent Number: 4,828,910

[45] Date of Patent: May 9, 1989

[54] SOUND ABSORBING LAMINATE

[76] Inventor: Reinhold Haussling, Posffach 1269, 6734 Lambrecht/Pflaz, Fed. Rep. of Germany

[21] Appl. No.: 133,570

[22] Filed: Dec. 16, 1987

[51] Int. Cl.[4] .............................................. B32B 15/00
[52] U.S. Cl. ..................................... 428/284; 428/280; 428/282; 428/285; 428/286; 428/287; 428/300; 428/423.1; 428/425.6
[58] Field of Search ............... 428/284, 285, 287, 300, 428/280, 282, 413.1, 425.6, 286

[56] References Cited

U.S. PATENT DOCUMENTS

| | | | |
|---|---|---|---|
| 2,768,026 | 10/1956 | Stephens et al. | 296/137 |
| 3,046,173 | 7/1962 | Copeland | 428/156 |
| 3,082,143 | 3/1963 | Smith | 156/229 |
| 3,506,532 | 4/1970 | Bock et al. | 161/121 |
| 3,531,367 | 9/1970 | Karsten | 161/160 |
| 3,620,906 | 11/1971 | Hannes | 296/137 |
| 4,002,567 | 1/1977 | Thomas | 296/137 |
| 4,059,660 | 11/1977 | Roth et al. | 264/46.4 |
| 4,119,749 | 10/1978 | Roth et al. | 428/71 |
| 4,256,797 | 3/1981 | Stamper et al. | 428/215 |
| 4,463,043 | 7/1984 | Reeves et al. | 428/68 |
| 4,474,846 | 10/1984 | Doerer et al. | 428/284 |
| 4,489,126 | 12/1984 | Holtrop et al. | 428/246 |
| 4,521,477 | 6/1985 | Hiss | 428/284 |
| 4,526,829 | 7/1985 | Holtrop et al. | 428/286 |
| 4,526,831 | 7/1985 | Hatchadoorian et al. | 428/284 |
| 4,531,994 | 7/1985 | Holtrop et al. | 428/286 |
| 4,608,104 | 8/1986 | Holtrop et al. | 428/286 |
| 4,680,219 | 7/1987 | Vernors et al. | 428/284 |
| 4,729,917 | 3/1988 | Symdra et al. | 428/285 |
| 4,778,717 | 10/1988 | Fitchmun | 428/286 |
| 4,784,898 | 11/1988 | Raghava | 428/284 |

*Primary Examiner*—James J. Bell
*Attorney, Agent, or Firm*—Price, Heneveld, Cooper, DeWitt & Litton

[57] ABSTRACT

There are provided laminate structures comprising a reinforcing fibrous mat integrally bonded to a resilient fibrous batt. The mat is preferentially a porous mat of resin-bonded chopped glass fiber. The batt is preferentially a porous bat of natural or synthetic fibers. Preferentially, the laminate comprises a core of resilient fibrous batt sandwiched between two facing sheets of reinforcing fibrous mat, with a decorative cover layer being laminated to the exterior surface of one reinforcing fibrous mat, the whole being bonded together by a thermoset binder into a unitary structure.

62 Claims, 1 Drawing Sheet

SOUND ABSORBING LAMINATE

BACKGROUND OF THE INVENTION

The present invention relates to forming three-dimensionally contoured articles such as automobile headliners. In the past, many automobile headliners have been formed by molding them of fiberglass reinforced polyester resin, often in a lay up molding process, as distinguished from thermoforming. One company molds such a product of glass reinforced polyester resin, laminated to a rigid urethane foam and covered by a soft urethane backed fabric. Such fiberglass reinforced polyester resin headliners act as a sound board, thus making the interior of the vehicle more noisy. Further, the lay up molding process is costly.

Some have eliminated the boardiness of fiberglass resin headliners by thermoforming a laminate comprised of a stiff structural yet thermoformable polystyrene foam layer and layers of kraft paper or a polymer film material bonded to either side of the foam. This laminate is covered with a soft polyurethane backed fabric. Thermoforming as opposed to lay up molding is cost effective. A laminate of a stiff polystyrene element with kraft paper or polymer film bonded to either side can be readily mass produced on automated equipment, cut into sheets, heated in a thermoforming operation and vacuum formed to shape. However, such headliners do not have sufficiently desirable sound absorbing properties because the kraft paper tends to reflect the sound rather than absorb it. The closed cell foam core itself is thought to be very effective in stopping sound transmission.

Many have endeavored to eliminate the paper or polymer film covering from such laminates and substitute a nonwoven fabric batt on one or more both sides of the stiff polystyrene foam element in order to achieve better sound absorbing properties. One problem with this and other thermoformable foam core laminates is that automobile headliners must be able to withstand relatively high environmental use temperatures, i.e., 185° F. The structural foam polystyrene-fabric laminate tends to delaminate and/or sag when exposed to such high temperatures. One reason for this is that the adhesive used to adhere the laminate components together has to be thermoplastic or equivalent in order to be thermoformable. Thermoplastic adhesives of higher melting points tend to lack the desired adhesive ability for adhering the foam core layer to the outer layers of the laminate.

Those skilled in this art have spent years searching unsuccessfully for solutions to these problems. As a result, thermoformed kraft paper or polymer film and structural foam polystyrene laminate and molded fiberglass reinforced polyester resin based laminates remain the principal automobile headliner constructions in use today.

SUMMARY OF THE INVENTION

In the present invention, it has been surprisingly found that substantially improved sound absorbing properties can be achieved using a laminate comprising a resilient, porous fibrous core layer, to which is adhered a fibrous, porous reinforcing mat to give the composite strength. Preferably, adherence is achieved by impregnating the fibrous, porous reinforcing mat with a thermosetting polymer immediately prior to molding the laminate material in a heated mold. Most preferably, a thermosetting, elastomeric polymer is used.

The resulting three-dimensional panel is porous and has excellent sound absorptive and/or sound deadening properties. It also has a desirable resilient feel. These and other objects, advantages and features of the present invention will be more fully understood and appreciated by reference to the written specification and appended drawings.

DESCRIPTION OF THE PREFERRED EMBODIMENTS

Figure 1:
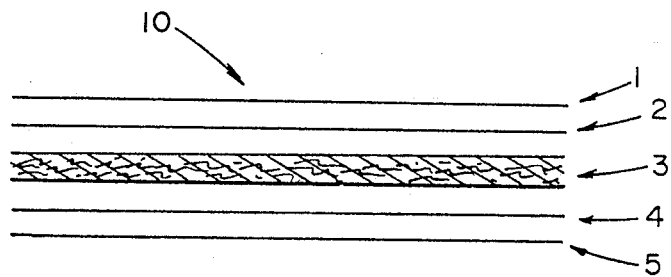
FIG. 1 schematically illustrates a cross-sectional view of a laminated structure formed in accordance with the invention with the laminate layers also separated for convenient illustration.
Figure 2:
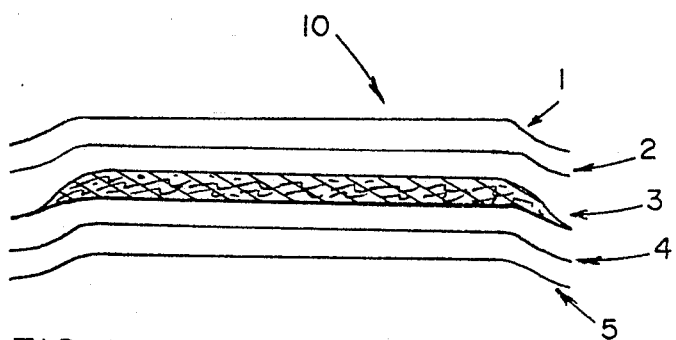
FIG. 2 shows the same structure after molding, again with the laminate layers shown separated for convenient illustration.

In the preferred embodiment, laminate 10 includes a resilient, porous fibrous batt interior core member 3 having two outer surfaces, each of which is bonded to fibrous, porous reinforcing mats 2 and 4, respectively (FIG. 1). Bonding is achieved by coating fibrous mats 2 and 4 with an uncured thermosetting, preferably elastomeric resin, shortly prior to molding in a heated mold, where the thermosetting resin is cured. Preferably prior to molding, mat 2 is covered by a decorative cover material 1 and mat 4 is covered by a mold release liner material 5. Laminate 10 is moldable to form a predetermined geometrical configuration, typically exhibiting a three-dimensional shape having contoured surfaces characterized by the presence of one or more compound curves (FIG. 2).

Resilient, nonwoven fibrous batt 3 comprises a multitude of substantially randomly oriented synthetic or natural fibers having a denier of 4.5 to 25, preferably 6. Batt 3 is formed from fibers having a length of ½ inch to 3 inches to a thickness of about ½ to 1½ inches, a weight of about 2 to 11 ounces per square yard and a preferred weight of about 5 ounces per square yard. The fibers are needled to cause them to intermesh and tend to orient generally transversely to the planes of the surfaces of the batt. A substantial portion of the fibers are oriented generally transverse to the planes of the surfaces of the batt, giving it resilience. The resilience and porosity of nonwoven batt core 3 is believed to be important to the sound absorbing/deadening characteristics of the laminate. After the nonwoven fibrous bats have been needled, the batt thickness will be reduced to about 0.25 to 1.75 inches.

The fibers used to form fibrous batt 3 are preferably thermoformable. It is desirable that they take a set when placed in a heated mold so as to tend to hold a three-dimensional configuration. Also, it is desirable that they be compressible in the heated mold so that tight, compact margins can be formed at the edges of the molded article or at edges of openings therein. Thermoplastic fibers are preferred, though their melting point should be substantially greater than the temperatures to which the end product may be exposed in intended use. Yet, the melting point should be low enough that the material takes a set and compacts at the edges at reasonable molding temperatures, e.g., 250° F. to 350° F.

Preferably, the fiber is virgin polyester in a length of ½ to 2½ inches, which is selected for its loft and sound absorption characteristics. The polyester fibers available typically have a melting point of from about 450° F. to about 550° F. Examples of other fibers which could be employed include nylon and polypropylene. Nonwoven polyester fiber is a particularly preferred material in forming the nonwoven fibrous batts of this invention because of its excellent elongation and molding characteristics at molding temperatures.

The needled nonwoven fibrous batt 3 is coated with a fusible binder resin which impregnates the batt and adheres the fibers to one another, giving the batt integrity. Preferably, fibrous reinforcing mats 2 and 4 are placed next to their respective surfaces of fibrous core 3 before the fibrous core binder is dried. This causes the fibrous reinforcing mats to adhere in a somewhat temporary fashion to resilient, fibrous core 3. This adherence is temporary in nature in that it would not be sufficiently strong adherence to create a service worthy end product. However, it is sufficiently tenacious to facilitate handling the laminate prior to molding.

The binder in the batt is then dried. The binder resin is applied at a rate that will deposit a weight of about 2 to 8 ounces per square yard after drying. This binds the individual fibers to one another without clogging the pores of the batt. The batt remains porous. Preferably, the dried weight is about 3 ounces per square yard. The rate of application of the binder resin is selected to provide binder penetration throughout the entire fiber batt to enhance dimensional stability of the batt while leaving the batt with a substantial air porosity on the order of 10 to 60%, preferably about 40%. Air porosity is determined by comparing the flow of a moving stream of air through an opening before and after the batt is placed over the opening, as set forth in ASTM C-384.

The binder resin must be thermoformable to accommodate the molding process, must not be sensitive to water and must not be tacky at room temperature. This requires a thermoplastic or equivalent material. The preferred glass transition temperature ($T_g$) for the resin is between 60° F. and 250° F. The preferred solid content is about 30 to 60% and a fire retardant such as aluminum trihydrate is provided at about 5% by volume. A binder resin may be selected from the group including water dispersed urethane, acrylic, ethylene vinyl acetate acrylic, styrene butadiene rubber, polyvinyl acetate, polyvinyl acrylic copolymer, epoxy and water-based styrene. The most preferred binder resin is a styrene butadiene rubber having a solid content of 48.5% and a $T_g$ of 104° F. Such a resin is sold by Reichhold Corporation under the trade name "TYLAC 68-500".

Fibrous reinforcing mats 2 and 4 are relatively thin, nonextendable, porous mats comprising a plurality of random length, randomly dispersed fibers (or a continuous monofilament strand laid in an overlapping pattern) either thermobonded i.e., heat-fused, together or bonded together by sufficient binder to bond them (or to bond a single strand upon itself where it overlaps), but not sufficient binder to interfere excessively with porosity. The fibers are oriented in the plane of the mat. The fibrous mat can also be made of a monofilament strand. Mats 2 and 4 are sufficiently thin that they do not begin to generate a boardy sound or feel. A thickness of from about 10 to about 20 mils (0.010 to 0.020 inches) is preferred. Such mats can be obtained in fiberglass, for example, from Gevetex Aachen GmbH of Germany in the monofilament version at 150 gm/m² or in the staple or plural fiber version at 150 gm/m².

Mats 2 and 4 must be "nonextendable" in the sense that they will not stretch when exposed to heat in the vicinity of 185°–250° F., the critical environmental testing temperature for automobile headliners. If mats 2 and 4 were extendable when exposed to such temperatures, headliners formed from such mats would sag when exposed to heat.

It is also important that mats 2 and 4 be porous to a sufficient degree that they do not act as sound reflectors in the same sense as a sheet of kraft paper, a polymer film or a layer of solid fiberglass reinforced resin. The porosity of mats 2 and 4 allows sound to penetrate and be absorbed by the nonwoven fiber batt 3 rather than bouncing off mats 2 and 4. While precise measures of porosity are difficult to specify and while there will be a great deal of latitude allowed to those skilled in the art, mats 2 and 4 are preferably sufficiently porous that one can gently blow air at them and feel it coming through the other side. Typically, mats 2 and 4 will have a light porosity or void spaces in the range from 60 to 80%, preferably 70%, determined by the percentage of light passing through the mat. Air porosity for such mats will be in excess of 90%, e.g., 98%.

Mats 2 and 4 are formed from fibers which soften at a temperature in excess of 350° F., preferably in excess of 400° F., and most preferably in excess of 500° F. High melting point polyester fibers are acceptable, generally softening at temperatures between 400° F. and 500° F. Glass fibers are the most preferred, softening at temperatures far in excess of 500° F. Polymeric materials softening at temperatures lower than 350° F., such as polyolefins, are not operable in this invention. Excessive sag results from the use of such materials, even though the test temperature is only 185° F.

In the most preferred mode contemplated, mats 2 and 4 comprise a plurality of glass fibers bonded together by a thermoformable resin, i.e., a thermoplastic or equivalent material. It is necessary that the resin be thermoplastic or equivalent so that the mats 2 and 4 can be configured along with core 3 during the molding operation. The mats are preferably from about 10 to 20 mils thick. The glass fibers are chopped from roving and the roving strands are approximately 10 microns thick and approximately 2 inches long or more when chopped. The fibers have a specific gravity of about 2.5 to 2.7. This fabric weighs in the range of 2 ounces per square yard at a thickness of 12 mils. Its density is about 14 pounds per cubic foot, of which 80% in glass fibers and 20% is binder. Thus, the fiber density of the mat is about 11.25 pounds per cubic foot and the binder density is about 2.7 pounds per cubic foot. Just sufficient binder is used to hold the glass strands together, so that the presence of the binder does not unduly hinder the porosity. Such a mat is available from Roth Freres.

An alternative mat material which may work in some circumstances, but which is not as effective as the above described porous fiberglass mat is a spun-bonded polyester mat of comparable porosity and thickness. A high temperature polyester fiber must be employed. An example of such material is a 2.1 Bontex ™ available from Van Waters & Rogers, Inc. of Kansas City, Kans. This material weighs in the range of 2.1 ounces per square yard at a thickness of about 12 mils, or about 15 pounds per cubic foot. The individual fiber density is about 1.38 grams per cubic centimeter. The fibers have a softening temperature in excess of 400° F. This material is somewhat less porous, given that the overall mat densities are comparable and the fiber density per se is less. Nevertheless, one can notice the passage of air through the mat when blowing air against it.

Fibrous reinforcing mats 2 and 4 are coated with a curable thermoset, preferably elastomeric, resin composition shortly prior to placing the laminate in a heated mold. The resin impregnates the porous mats 2 and 4 and the interface between them and fibrous batt core 3. Spray coating is the preferred method of application. The amount of resin used is sufficient to facilitate bonding between the mat and fibrous batt core 3, but is not sufficient to form a film over, in or under mat 2 or 4 which would interfere with its porosity and the porosity of the end product. Preferably, about 2 to 6, and most preferably about 4, grams of resin are applied per square foot of mat surface area. At that level, the applied resin binder has almost no impact on porosity of the final product. Indeed, in the preferred embodiment, the porosity of core 3 and mats 2 and 4 laminated together and with resin binder applied and cured is about the same as for batt core 3 alone.

The advantage of using a thermoset resin is that once it is cured, it will have very high resistance to heat distortion or deterioration. It will give tremendous strength to the laminate, even at higher temperatures often encountered inside of an automobile on a hot day. The resin is, of course, applied in its uncured state, shortly before the laminate is placed in a mold. The resin is cured in the heated mold.

The thermoset resin is preferably elastomeric in nature so that laminate 10 does not become too boardy. Boardiness gives a laminate poor sound absorbing or deadening qualities. It must also exhibit excellent adhesion properties between the laminate layers.

A preferred thermosetting elastomeric resin is elastomeric urethane. A representative curable elastomeric urethane composition comprises 100 parts by weight of a polyol having three or four hydroxyl groups, 85 parts by weight of an isocyanate compound having at least two reactive isocyanate groups, with a methylene-bis (phenyl isocyanate) being particularly preferred; 0.05 to 0.10 parts of a catalyst such as tin octoate or lead naphthanate; and 5 to 20 parts of solvent such as trichlorofluoromethane or methylene chloride. The solvent serves to dilute the solution in order to facilitate its application by spraying, brushing or by an impregnating roller. An example of the most preferred resin is Butofan TM Ds 2165 available from BASF CmbH.

Decorative cover sheet 1 which covers the exposed or exterior surface of at least one of the fibrous reinforcing mats is preferably a porous fabric material. A porous fabric will provide minimum interference with the porosity of the end product. A preferred fiber for such fabric would be thermoformable so that cover 1 can be applied to the uncured resin coated surface of reinforcing mat 2 prior to thermoforming. The cured resin then serves as the adhesive to bond cover 1 in place in the final product. A particularly preferred thermoformable polymeric fabric cover sheet comprises a nylon warp knit cloth material.

Even if a nonporous cover 1 is used, laminate 10 will still provide excellent sound deadening characteristics, i.e., will deaden vibrations of a sound generator. However, porosity is preferred so as not to interfere with the excellent sound absorbing characteristics of porous batt 3 and porous mat 2.

Release layer 5 is preferably a porous cloth scrim. Release layer 5 is adhesively secured to fibrous reinforcing mat 4 through the urethane elastomer composition. Release layer 5 prevents sticking of laminate 10 to the mold surface during the molding operation. After the urethane elastomer composition is cured in the mold, contoured laminate 20 is easily removed from the mold. The porosity of layer 5 is not critical since it will be on the hidden side of the product in use and sound can still be absorbed through the exposed porous surface of cover 1.

Laminates 10 are produced by advancing individual webs of material toward a molding station. A web of nonwoven fibrous batt 3, preferably with its binder resin still wet, is fed between mats 2 and 4 and in contact with their adjacent surfaces to effect temporary adhesion thereto. This temporary laminate is advanced after drying to a coating station where fibrous reinforcing mats 2 and 4 are coated on their exposed exterior surfaces with the polymerizable polyurethane elastomer. The urethane resin impregnates mats 2 and 4 and their interface with batt core 3. Decorative cover layer 1 and release layer 5 are brought into contact with their adjacent surfaces of mats 2 and 4 while the thermoset resin material is still wet and uncured to form laminate 10. Laminate 10 is preferably passed through a set of rollers and then introduced into a heated mold which has a predetermined geometrical configuration. The laminate 10 should be at least 20% thicker prior to molding than the mold cavity in order to provide good definition in the molded part. Molding of laminate 10 to produce the shape of configured part 20 (FIG. 2) is effected under conditions of heat and pressure sufficient to effect curing of the polymerizable thermoset elastomer resin, to set the thermoformable fibers of core 3 into their new shape and to compress those fibers at the laminate periphery, including the peripheries of any openings which may be formed in laminate 10, to form a dense unitary bond line.

Of course it is understood that the above is merely the preferred embodiment and that changes and alterations can be made without departing from the spirit and broader aspects thereof.

The embodiments of the invention in which an exclusive property or privilege is claimed are defined as follows:

1. A moldable laminate structure comprising:
   a core defined by a resilient thermoformable, porous fibrous batt having a thickness of at least about one-quarter of an inch;
   a first reinforcing, porous fibrous mat on one surface of said batt and being coated with sufficient resin binder to impregnate said fibrous mat and its interface with said fibrous batt to effect adherence therebetween, but insufficient resin binder to form a porosity blocking film on a final molded product.

2. A moldable laminate structure in accordance with claim 1 wherein said resin binder comprises a curable thermosetting binder composition.

3. A moldable laminate structure in accordance with claim 1 wherein said resin binder comprises a curable thermosetting elastomer composition.

4. A moldable laminate structure in accordance with claim 3 wherein said resin binder comprises a thermosetting urethane elastomer composition.

5. A moldable laminate structure in accordance with claim 3 wherein the fibers of said resilient fibrous batt are thermoplastic and are held together by a thermoplastic binder and the fibers of said reinforcing fibrous mat are held together by a thermoplastic binder to facilitate thermoforming and whereby said batt and said mat can be permanently compressed along the marginal edges of the laminate structure to create strong, well defined marginal edges.

6. A moldable laminate structure in accordance with claim 5 wherein said resin binder comprises a thermosetting urethane elastomer composition.

7. A moldable laminate structure in accordance with claim 3 wherein said fibrous batt has an air porosity in the range from 10 to 60% and said fibrous mat has an air porosity of at least 90%.

8. A moldable laminate structure in accordance with claim 7 wherein the fibers of said resilient fibrous batt are thermoplastic and are held together by a thermoplastic binder and the fibers of said reinforcing mat are held together by a thermoplastic binder to facilitate thermoforming and whereby said batt and said mat can be permanently compressed along the marginal edges of the laminate structure to create strong, well-defined marginal edges.

9. A moldable laminate structure in accordance with claim 7 wherein said binder resin comprises a curable thermosetting urethane elastomer.

10. A moldable laminate structure in accordance with claim 9 wherein said fibrous batt has an air porosity of about 40%.

11. A moldable laminate structure in accordance with claim 3 having a decorative porous fabric cover layer laminated to the other face of said first reinforcing fibrous mat.

12. A moldable laminate structure in accordance with claim 11 wherein said resin binder comprises a curable thermosetting urethane elastomer composition which also adheres said cover layer to said first reinforcing fibrous mat.

13. A moldable laminate structure in accordance with claim 11 wherein said decorative porous fabric cover layer is thermoformable, the fibers of said resilient fibrous batt are thermoplastic and are held together by a thermoplastic binder and the fibers of said reinforcing mat are held together by a thermoplastic binder to facilitate thermoforming and whereby said decorative cover layer, batt and said mat can be permanently compressed along the marginal edges of said laminate structure to create strong, well defined marginal edges.

14. A moldable laminate structure in accordance with claim 13 wherein said resin binder comprises a curable thermosetting urethane elastomer composition.

15. A moldable laminate structure in accordance with claim 13 wherein said fibrous batt has an air porosity in the range from 10 to 60% and said fibrous mat has an air porosity of at least 90%.

16. A moldable laminate structure in accordance with claim 13 wherein said resin binder comprises a curable thermosetting urethane elastomer composition.

17. A moldable laminate structure in accordance with claim 16 wherein said fibrous batt has an air porosity of about 40%.

18. A moldable laminate structure in accordance with claim 3 having one face of a second reinforcing porous fibrous mat on the other surface of said resilient fibrous batt and being coated with sufficient resin to impregnate said second reinforcing mat and its interface with said fibrous batt to effect adherence therebetween, but insufficient resin binder to form a porosity blocking film on a final molded product.

19. A moldable laminate structure in accordance with claim 18 wherein said resin binder comprises a curable thermosetting urethane elastomer composition.

20. A moldable laminate structure in accordance with claim 18 wherein the fibers of said resilient fibrous batt are thermoplastic and are held together by a thermoplastic binder and the fibers of said reinforcing fibrous mats are held together by a thermoplastic binder to facilitate thermoforming and whereby said batt and said mats can be permanently compressed along the marginal edges of said laminate structure to create strong well-defined marginal edges.

21. A moldable laminate structure in accordance with claim 20 wherein said resin binder comprises a curable thermosetting urethane elastomer composition.

22. A moldable laminate structure in accordance with claim 18 wherein said resilient fibrous batt has an air porosity in the range from 10 to 60% and said reinforcing fibrous mat has an air porosity of at least 90%.

23. A moldable laminate structure in accordance with claim 22 wherein said resin binder comprises a curable thermosetting urethane elastomer composition.

24. A moldable laminate structure in accordance with claim 23 wherein said resilient fibrous batt has an air porosity of about 40%.

25. A moldable laminate structure in accordance with claim 22 wherein the fibers of said resilient fibrous mat are thermoplastic and are held together by a thermoplastic binder and the fibers of said reinforcing mats are held together by a thermoplastic binder to facilitate thermoforming and whereby said batt and said mats can be permanently compressed along the marginal edges of said laminate structure to create strong, well-defined marginal edges.

26. A moldable laminate structure in accordance with claim 25 wherein said resin binder comprises a curable thermosetting elastomer composition.

27. A moldable laminate structure in accordance with claim 26 wherein said resilient fibrous batt has an air porosity of about 40%.

28. A moldable laminate structure in accordance with claim 3 having a release layer laminated to the other surface of said reinforcing fibrous mat.

29. A moldable laminate structure in accordance with claim 28 wherein the fibers of said resilient fibrous batt are thermoplastic and are held together by a thermoplastic binder and the fibers of said reinforcing fibrous mat are held together by a thermoplastic binder to facilitate thermoforming and whereby said batt and said mat can be permanently compressed along the marginal edges of said laminate structure to create strong well-defined marginal edges.

30. A moldable laminate structure in accordance with claim 29 wherein said resilient fibrous batt has an air porosity in the range from 10 to 60% and said reinforcing fibrous mat has an air porosity of at least 40%.

31. A moldable laminate structure in accordance with claim 30 wherein said resin binder comprises a curable thermosetting urethane elastomer composition.

32. A moldable laminate structure in accordance with claim 18 having a decorative porous fabric cover layer laminated to the other face of said first reinforcing fibrous mat and a release layer laminated to the other surface of said second reinforcing fibrous mat.

33. A moldable laminate structure in accordance with claim 32 wherein said resin binder comprises a curable thermosetting urethane elastomer composition.

34. A moldable laminate structure in accordance with claim 32 wherein said decorative porous fabric cover layer is thermoformable, the fibers of said resilient fibrous batt are thermoplastic and are held together by a thermoplastic binder and the fibers of said reinforcing mats are held together by a thermoplastic binder to facilitate thermoforming and whereby said cover layer, said batt and said mats can be permanently compressed along the marginal edges of said laminate structure to create strong, well-defined marginal edges.

35. A moldable laminate structure in accordance with claim 34 wherein said resin binder comprises a curable thermosetting urethane elastomer composition.

36. A moldable laminate structure in accordance with claim 32 wherein said fibrous batt has an air porosity in the range from 10 to 60% and said fibrous mat has an air porosity of at least 90%.

37. A moldable laminate structure in accordance with claim 36 wherein said resin binder comprises a curable thermosetting urethane elastomer composition.

38. A moldable laminate structure in accordance with claim 37 wherein said resilient batt has an air porosity of about 40%.

39. A moldable laminate structure in accordance with claim 36 wherein said decorative porous fabric cover layer is thermoformable, the fibers of said resilient fibrous batt are thermoplastic and are held together by a thermoplastic binder and the fibers of said reinforcing fibrous mat are held together by a thermoplastic binder to facilitate thermoforming and whereby said cover layer, said batt and said mats can be permanently compressed along the marginal edges of said laminate structure to create strong, well-defined marginal edges.

40. A molded laminate structure in accordance with claim 39 wherein said resin binder comprises a curable thermosetting urethane elastomer composition.

41. A molded laminate structure in accordance with claim 40 wherein said resilient batt has an air porosity of about 40%.

42. A moldable sound absorbing laminate structure comprising:
a core defined by a thermoformable resilient porous fibrous batt having a thickness of at least about one-quarter inch, the fibers of said fibrous batt being held together by a thermoformable binder;
at least a first porous fibrous reinforcing mat adhered to one surface of said batt by said thermoformable binder; and
whereby said batt and said mat form a prelaminate which can be readily handled without delamination for subsequent impregnation with a thermosetting resin binder immediately prior to molding in a heated mold.

43. A moldable sound-absorbing laminate structure in accordance with claim 42 wherein the fibers of said resilient fibrous batt are thermoplastic and are held together by a thermoplastic binder and the fibers of said reinforcing mat are held together by a thermoplastic binder.

44. A moldable sound-absorbing laminate structure in accordance with claim 42 wherein a second porous fibrous reinforcing mat is adhered to an opposite surface of said batt by said thermoformable binder.

45. A moldable sound-absorbing laminate structure in accordance with claim 44 wherein the fibers of said resilient fibrous batt are thermoplastic and are held together by a thermoplastic binder and the fibers of said reinforcing mat are held together by a thermoplastic binder.

46. A molded contoured three-dimensional laminated structure comprising a first reinforcing porous fibrous mat laminated on one face thereof to one face of a resilient porous fabric batt having a thickness of at least about one-quarter inch, said first reinforcing mat and said resilient batt being bonded together by a thermoset binder composition into a unitary laminated structure, said laminated structure having permanently compressed, strong, well-defined marginal edges.

47. A laminated structure in accordance with claim 46 wherein said thermoset composition comprises a thermoset elastomer binder composition.

48. A laminated structure in accordance with claim 46 wherein said thermoset composition comprises a thermoset urethane elastomer binder composition.

49. A laminated structure in accordance with claim 47 wherein said resilient batt has an air porosity in the range from 10 to 60% and said reinforcing mat has an air porosity of at least 90%.

50. A laminated structure in accordance with claim 49 wherein said resilient batt has an air porosity of about 40% and said thermoset composition comprises a thermoset urethane elastomer binder composition.

51. A laminated structure in accordance with claim 47 having a decorative porous fabric cover layer laminated to the other face of said first reinforcing fibrous mat.

52. A laminated structure in accordance with claim 51 wherein said thermoset composition comprises a thermoset urethane elastomer binder composition.

53. A laminated structure in accordance with claim 51 wherein said resilient batt has an air porosity in the range from 10 to 60% and said reinforcing mat has an air porosity of at least 90%.

54. A laminated structure in accordance with claim 53 wherein said resilient batt has an air porosity of about 40% and said thermoset composition comprises a thermoset urethane elastomer binder composition.

55. A laminated structure in accordance with claim 47 having one face of a second porous fibrous reinforcing mat bonded to the other face of said resilient fibrous batt.

56. A laminated structure in accordance with ciaim 55 wherein said resilient batt has an air porosity in the range from 10 to 60% and said reinforcing mats have an air porosity of at least 90%.

57. A laminated structure in accordance with claim 56 wherein said resilient batt has an air porosity of about 40% and said thermoset composition comprises a thermoset urethane elastomer binder composition.

58. A laminated structure in accordance with claim 55 having a decorative porous fabric cover layer laminated to the other face of said first reinforcing fibrous mat.

59. A laminated structure in accordance with claim 58 wherein said thermoset composition comprises a thermoset urethane elastomer binder composition.

60. A laminated structure in accordance with claim 58 wherein said resilient batt has an air porosity in the range from 10 to 60% and said reinforcing mats have an air porosity of at least 90%.

61. A laminated structure in accordance with claim 60 wherein said thermoset composition comprises a thermoset urethane elastomer composition.

62. A laminated structure in accordance with claim 61 wherein said resilient batt has an air porosity of about 40%.

* * * * *